United States Patent [19] [11] Patent Number: 4,903,212
Yokouchi et al. [45] Date of Patent: Feb. 20, 1990

[54] GPS/SELF-CONTAINED COMBINATION TYPE NAVIGATION SYSTEM

[75] Inventors: Kazuhiro Yokouchi; Tatsumi Kageyama, both of Hyogo; Chogo Sekine, Tokyo; Harumasa Hojo, Tokyo; Koji Yamada, Tokyo; Makoto Mikuriya; Seiichiro Hirata, both of Hyogo, all of Japan

[73] Assignees: Mitsubishi Denki Kabushiki Kaisha; Japan Radio Co., Ltd., both of Tokyo, Japan

[21] Appl. No.: 167,093

[22] Filed: Mar. 11, 1988

[30] Foreign Application Priority Data

Mar. 13, 1987 [JP] Japan .................................. 62-56683
May 22, 1987 [JP] Japan ................................ 62-125139

[51] Int. Cl.⁴ ...................... G06F 15/50; G01C 21/00
[52] U.S. Cl. ..................................... 364/449; 364/443; 364/460; 364/571.01; 342/357; 342/451; 342/461
[58] Field of Search ............... 364/449, 450, 452, 454, 364/457, 424.01, 424.02, 459, 571.01; 340/988, 989, 990, 995; 342/450, 451, 457, 357, 461

[56] References Cited

U.S. PATENT DOCUMENTS 3,940,597  2/1976  DiMatteo ........................... 364/454
4,024,382  5/1977  Fowler ................................ 364/449
4,335,433  6/1982  Bauer et al. ......................... 364/450
4,459,667  7/1984  Takeuchi ............................. 364/449
4,713,767  12/1987 Sato et al. ........................... 364/454
4,731,613  3/1988  Endo et al. ......................... 364/450

FOREIGN PATENT DOCUMENTS

0111143  5/1986  Japan ................................. 340/988
0138113  6/1986  Japan ................................. 340/988
0138114  6/1986  Japan ................................. 340/988
0167813  7/1986  Japan ................................. 340/988

Primary Examiner—Parshotam S. Lall
Assistant Examiner—V. Trans
Attorney, Agent, or Firm—Lowe, Price, Leblanc, Becker & Shur

[57] ABSTRACT

In a global positioning system (GPS)/self-contained combination type navigation system for a vehicle, the GPS navigation data are received by the GPS antenna of the navigation system which are simultaneously transmitted from more than 3 pieces of satellites inclusively. From the GPS navigation data, GPS type velocity data is calculated, whereas self-contained type velocity data is calculated from self-contained type navigation data such as azimuth data and drive-distance data of the vehicle. Only when a difference between the self-contained type velocity data and the GPS type velocity data exceeds a threshold velocity, the GPS type velocity data is voided so as to determine the present position of the vehicle.

16 Claims, 8 Drawing Sheets

GPS/SELF-CONTAINED COMBINATION TYPE NAVIGATION SYSTEM

BACKGROUND OF THE INVENTION

1. Field of the Invention

The present invention generally relates to a navigation apparatus for moving objects, for instance, automobiles. More specifically, the present invention is directed to a vehicle-mount type navigation system in which both a GPS (Global Positioning System) type navigator and a self-contained type navigator are compatibly operated to accurately detect a present position of the vehicle even when GPS navigation waves transmitted from the satellites are not available in the position where the vehicle is being located.

2. Description of the Related Art

An attention is paid to the fact that a GPS positioning system is very useful in the case where navigation waves are transmitted from a plurality of satellites to various kinds of moving objects such as ships, airplanes, automobiles, and the present positions and moving velocities thereof are confirmed or determined. According to the GPS positioning system, the GPS navigation waves transmitted from a plurality of satellites are substantially simultaneously received, and then the present position, i.e., the two-dimensional or three-dimensional position of a moving object on and above the earth can be recognized.

As is known in the field, the positioning operation which is performed by using such a GPS positioning system is generally executed by receiving the GPS navigation waves transmitted from three or four or more satellites. When the GPS navigation waves from three satellites can be simultaneously received, the two-dimensional position (latitude and longitude) can be determined. On the other hand, when the navigation waves from four or more satellites can be simultaneously received, the three-dimensional position (latitude, longitude, and altitude) can be determined. The GPS navigation waves from a plurality of satellites are simultaneously received by a moving object. A desired correcting process is performed to the time shifts based on the differences of accuracies among timer devices provided for the plurality of satellites and a timer device provided for the moving object. Thereafter, the present position of the moving object is calculated and displayed on a display unit. At this time, the map information relating to the present position is superimposed with the information regarding the present position and thereafter displayed on the display unit.

Various types have been proposed as such a sort of conventional GPS positioning systems; for instance, "The Global Positioning System", by Martin R. Stiglitz, MICROWAVE JOURNAL, April 1986, pages 34 to 59; and "GPS NAVIGATION SYSTEM", Japan Radio Company's Technical Journal, No. 24, pages 16 to 23, issued on Jan. 25, 1986. An arrangement of the latter navigation system is shown in FIG. 1 and will be briefly explained hereinbelow.

Figure 1:
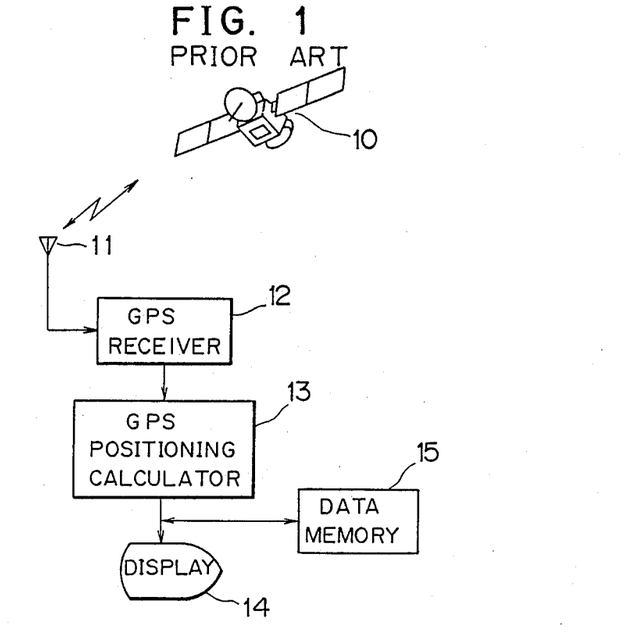
FIG. 1 is a schematic block diagram of the conventional GPS positioning apparatus.

In FIG. 1, the GPS navigation waves from a satellite 10 are received by a GPS antenna 11 attached to a moving object (not shown). An output terminal of the antenna 11 is connected to a GPS receiver 12. Pseudo distance data obtained by the GPS receiver 12 is supplied to a GPS positioning calculator 13. The calculator 13 calculates the accurate latitude, longitude, and altitude on the basis of the pseudo distance data, so that the accurate present position of this moving object is detected. The data regarding the present position obtained in this manner is stored into a data memory 15 and displayed as a visual image by a display 14 so as to overlap the related map.

To perform the foregoing two-dimensional or three-dimensional GPS positioning, the GPS navigation waves transmitted from at least three or four satellites among a plurality of satellites which constitute the GPS positioning system, need to be substantially simultaneously received by the GPS navigation system of a moving object. However, there are for example, obstacles such as skyscrapers or high mountains in cities or region sandwiched mountains so that the navigation waves transmitted from a desired number of (three or four or more) satellites cannot substantially simultaneously reach an antenna of a moving object and a desired GPS positioning cannot be performed. On the other hand, even if the GPS positioning may be performed, there is another problem such that the positioning accuracy remarkably deteriorates because of the attenuation of the GPS navigation waves caused by the reflection thereof due to the practical arrangement of the satellites with respect to a moving object or due to obstacles mentioned above.

On the other hand, a self-contained type navigation apparatus has conventionally widely been used as a navigator for various kinds of moving objects as mentioned above.

Different from the foregoing GPS navigation apparatus, in the self-contained type navigation apparatus, the present position of a moving object itself can be known on the basis of only the data obtained from the self-contained type navigator itself without utilizing the navigation data from the outside such as GPS navigation waves from satellites.

On the other hand, a vehicle-mount type navigator having a GPS positioning type navigating function and a self-contained type navigating function has been recently developed, in which either one of these functions is properly, intentionally selected by an operator.

In such a kind of vehicle-mount type navigator, when the GPS navigator function cannot be selected due to the presence of various kinds of obstacles, the self-contained type navigator function is selected and the present position or moving direction of a vehicle itself can be recognized or determined on the basis of only the data which is acquired from a drive-distance sensor or azimuth sensor.

It is now assumed that the GPS navigator function of the vehicle-mount type navigation apparatus is selected. In this case, a vehicle moves on a moving route while receiving the GPS navigation waves from the satellites through the GPS antenna. However, for example, assuming that a high building exists as an obstacle, the GPS navigation waves transmitted from a plurality of satellites cannot be received. Otherwise, the noises like the GPS navigation waves reflected by other disturbances are necessarily received, so that a positioning error is included in the display image of the present position of the vehicle (i.e., multipath noise). That is, on the displayed map, it looks as if the vehicle was remarkably deviated from the moving route. Such a phenomenon is called a "jump phenomenon". There is a fear such that the car driver of the vehicle erroneously confirms the present position due to the jump phenomenon and misdrives the vehicle, so that a serious traffic accident may occur.

The present invention has been made to solve such various conventional problems. It is the first object of the invention to provide a GPS navigation system in which even when the GPS positioning cannot be performed or the positioning accuracy deteriorates, the present position of a moving object an be accurately detected and determined by utilizing the position information of a self-contained type navigator.

A second object of the invention is to provide a vehicle-mount type navigation apparatus having both of the GPS type navigator function and the self-contained type navigator function, wherein in the case where the GPS navigator function is selected, at a time point when the GPS navigation data exceeds a reference value range, the collected GPS navigation data is ignored and simultaneously the navigation data derived by the self-contained type navigator function is used.

SUMMARY OF THE INVENTION

These objects of the invention are accomplished by providing a global positioning system (GPS)/self-contained combination type navigation system for a moving object comprising:

self-contained type positioning means (24 to 26) for acquiring self-contained type positioning information of the moving object;

a GPS type positioning unit (21 to 23) for acquiring GPS type positioning information from navigation data transmitted from a plurality of satellites arranged for constructing the global positioning system;

a correcting unit (28) for producing a correction signal to be supplied to the self-contained type positioning unit (24 to 26) based upon the GPS type positioning information, whereby corrected self-contained type positioning information is derived from the self-contained type positioning unit;

a present-position determining unit (27) for determining a present position of the moving object by processing one of the corrected self-contained type positioning information and GPS type positioning information, depending upon a reception condition of the GPS positioning information;

a map data memory unit (31) for previously storing map data required for navigating the moving object; and, a display unit (29 and 30) for displaying the present position of the moving object superimposed on the map data by receiving the output of the present position determining unit (27) and the map data from the map data memory unit (31).

Furthermore, a global positioning system (GPS)/self-contained combination type navigation system for a vehicle comprises;

a GPS type positioning unit (21;22;80) for acquiring GPS type positioning information from GPS navigation data transmitted from a plurality of satellites (10) arranged for constituting the global positioning navigation system;

a self-contained type positioning unit (24;25;82) for acquiring self-contained type positioning information of the vehicle;

a positioning-data processing unit (61) for processing both the GPS type positioning information from the GPS type positioning unit and the self-contained type positioning information from the self-contained type positioning unit so as to obtain GPS type velocity data and self-contained type velocity data, respectively;

a first memory (63) for temporarily storing the GPS type velocity data derived from the positioning-data processing unit (61);

a second memory (64) for temporarily storing the self-contained type velocity data derived from the positioning-data processing unit (61);

a comparator (85) for comparing said GPS type velocity-data read out from the first memory (63) with said self-contained type velocity-data read out from the second memory (64) thereby to obtain velocity comparison data; for a present-position determining unit (86) processing one of the GPS type velocity data and self-contained type velocity data so as to determine a present position of the vehicle by judging whether or not the velocity comparison data exceeds a threshold velocity;

a map data memory (31) for previously storing map data required for navigating the vehicle; and, a display unit (87;30) for displaying the present position of the vehicle superimposed on the map data by receiving the output of the present-position determining unit (86) and the map data from the map data memory (31).

According to the present invention, when the number of satellites whose navigation waves can be received among a plurality of satellites constituting the GPS positioning system becomes two or less and the GPS positioning cannot be performed, or when the positioning accuracy is not so high, by using the position information of the self-contained type navigation apparatus based on the azimuth information and drive distance information of a moving object which are obtained from an azimuth sensor and a drive-distance sensor, the present position of the moving object can be accurately detected According to the invention, when the GPS navigator function is selected and the GPS data at a certain positioning time point exceeds an allowable range based on the self-contained type data at this positioning time point, the GPS data obtained at the certain time point is ignored and the self-contained type data can be used as the navigator data of the moving object itself.

BRIEF DESCRIPTION OF THE DRAWINGS

For a better understanding of the above-described objects and features of the invention, reference is made to the specification and the accompanying drawings, in which.

Detailed Description of Preferred Embodiments
GPS/Self-Contained Combination Type Navigation System Referring now to a block diagram shown in FIG. 2, a GPS/self-contained combination type navigation system will be described.

For the sake of simplicity, only one satellite constituting the Global Positioning System is shown in the figure, from which the GPS navigation data, e.g., the time data, ephemeris data, and almanac data are being transmitted.

Figure 2:
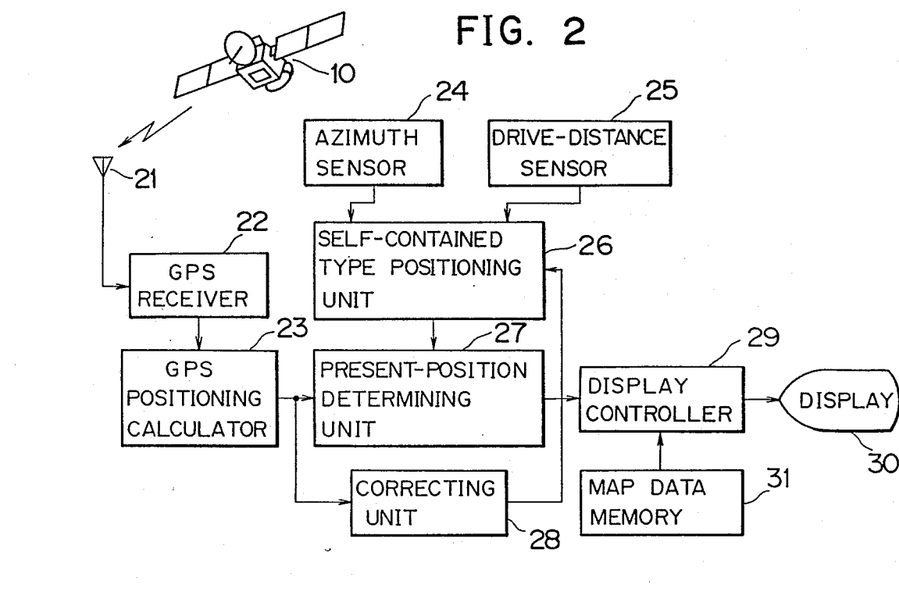
FIG. 2 is a schematic block diagram of a GPS/self-contained type navigation system according to a first preferred embodiment of the invention.

In FIG. 2, GPS navigation waves transmitted from arbitrary satellites (only one satellite being illustrated) 10 among a plurality of satellites constituting the GPS system are received by an antenna 21. The antenna 21 is connected to a GPS receiver 22 to perform desired signal processes such as amplification, demodulation, and the like of the received navigation waves. The GPS receiver 22 is connected to a GPS positioning calculator 23 to obtain the two-dimensional position or three-dimensional position of a moving object (not shown) on which this navigation system is mounted. On the other hand, an azimuth sensor 24 to detect the azimuth of the moving object and a drive-distance sensor 25 to detect the drive distance of the moving object are employed. The sensors 24 and 25 are connected to a self-contained type positioning unit 26 and accordingly, the present position of the moving object based on the self-contained type navigator can be detected. On the other hand, the GPS positioning calculator 23 and self-contained type positioning unit 26 are connected to a present-position determining unit 27. The GPS positioning calculator 23 is connected to the self-contained type positioning unit 26 through a correcting unit 28. When the positioning by the GPS navigation system can be performed, the correcting unit 28 executes a desired correcting calculation to the present position information of the moving object obtained by the self-contained type positioning unit 26 on the basis of the present position information derived by the GPS positioning calculator 23. Furthermore, the present-position determining unit 27 is connected to a display unit 30 through a display controller 29. The determining unit 27 has a function to select the GPS or self-contained type positioning data. That is, when the GPS positioning can be satisfactorily performed, the GPS present-position information obtained by the GPS positioning calculator 23 is selected by this present-position determining unit 23 and supplied to the display controller 29. To the contrary, when the GPS positioning cannot be performed due to, for instance, various disturbances, the present-position information obtained by the self-contained type positioning unit 26 is directly supplied to the display controller 29 under the control of the present-position determining unit 27. In the display controller 29, the map information relating to the present position of a moving object is read out from a map data memory 31 to form a state in which the present position of the moving object is superimposed on the map information. Then, the present position superimposed on the related map is displayed on the display unit 30.

Detailed Circuit Arrangement of GPS/Self-Contained Type Navigation System

Figure 3:
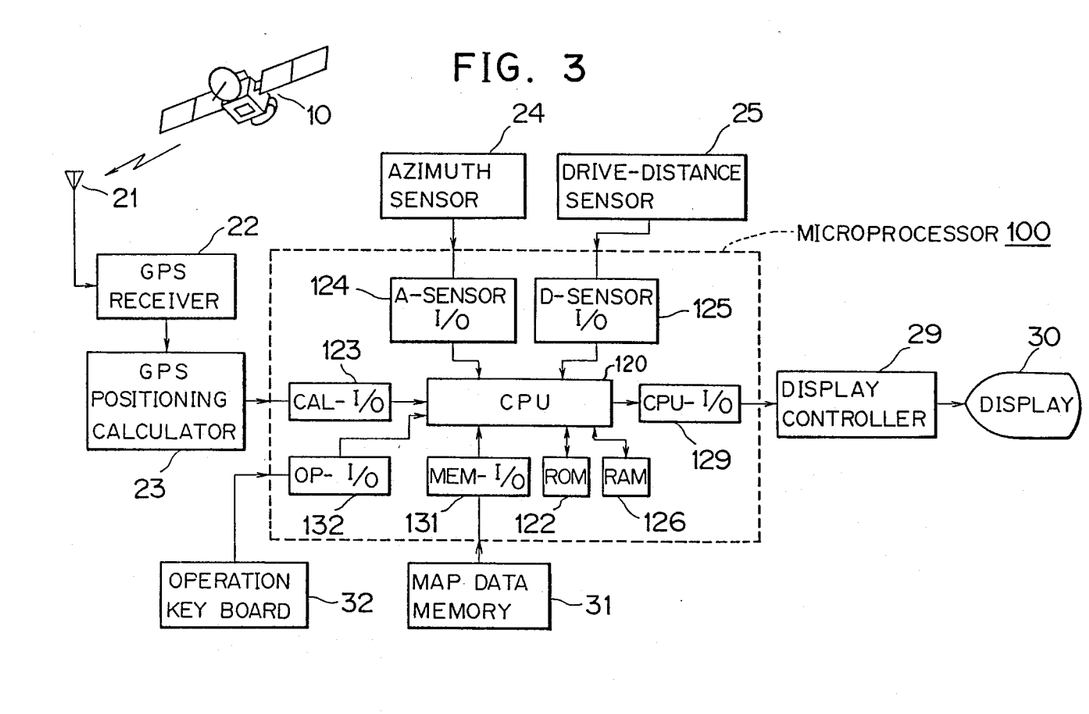
FIG. 3 is a detailed circuit block diagram of the GPS/self-contained type navigation system shown in FIG. 2.

FIG. 3 illustrates a circuit block diagram of the GPS/self-contained type navigation system corresponding to the navigation system shown in FIG. 2.

The same and similar components and elements as those in the system shown in FIG. 2 are designated by the same reference numerals.

In FIG. 3, a microprocessor 100 is employed. The GPS positioning calculator 23, azimuth sensor 24, drive-distance sensor 25, operation key 32, map data memory 31, and display controller 29 are connected to the microprocessor 100.

The microprocessor 100 includes: a CPU 120 to execute a predetermined arithmetic operating process to various kinds of input data; a ROM 122 to store various kinds of programs for allowing the CPU 120 to perform the desired arithmetic operating processes; an RAM 126 to temporarily store various kinds of data to be arithmetically operated, data acquired as results of the intermediate arithmetic operating processes, and the like; and input/output (I/O) circuits 123 to 125, 129, 131, and 132 to connect the corresponding components and elements 23 to 25, 29, 31, and 32 to the CPU 120, respectively. For example, the GPS positioning calculator 23 is connected to the CPU 120 through the CAL-I/O circuit 123. In a manner similar to the above, the azimuth sensor 24, drive-distance sensor 25, map data memory 31, and display controller 29 are connected to the CPU 120 through the corresponding I/O circuits 124, 125, 131, and 129, respectively. An operation key 32 provided for the microprocessor 100 is connected to the CPU 120 through the OP-I/O circuit 132.

Navigation Control

Figure 4A:
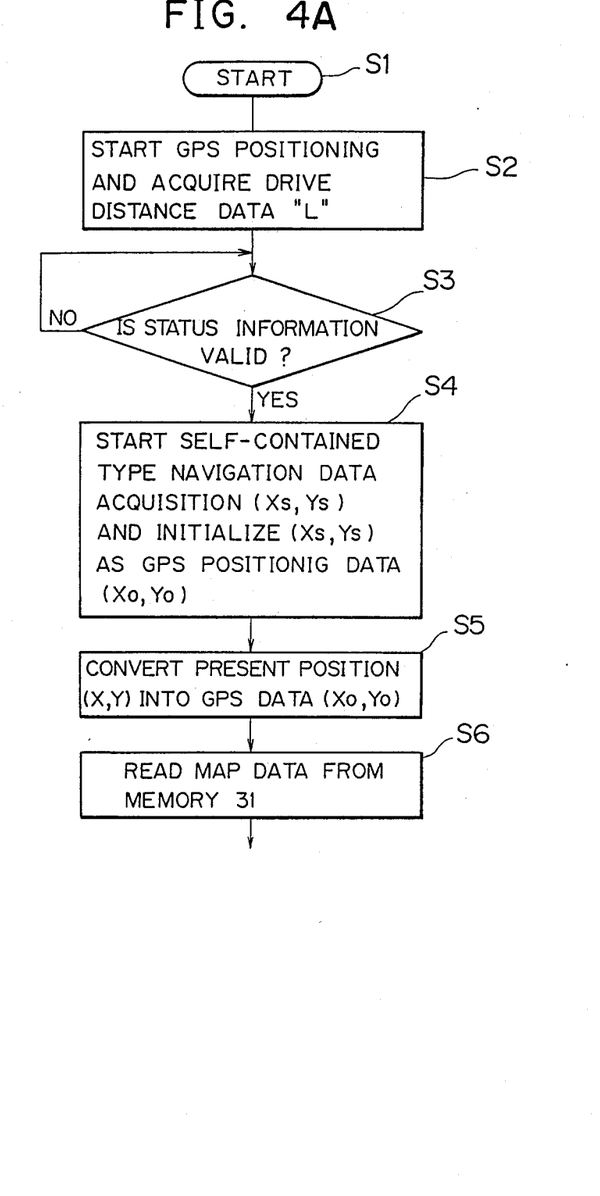
FIGS. 4A and 4B are flowcharts for explaining the navigation control by the system illustrated in FIG. 3.
Figure 4B:
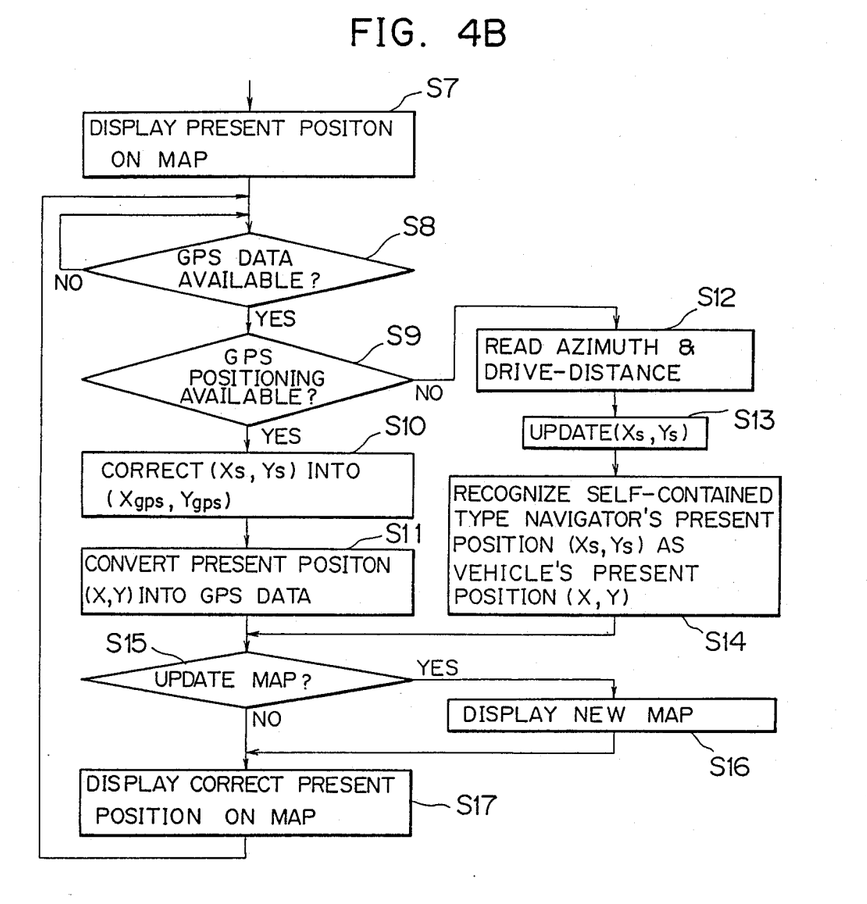

FIG. 4 is a flowchart showing an example of the operation in accordance with a predetermined control program stored in the ROM 122 in the microprocessor 100 in FIG. 3.

It is now assumed that a proper initializing command is output by selecting and depressing a desired function keyboard in the operation key 32 (step S1), a predetermined GPS positioning process i started in the GPS positioning calculator 23 in response to the initializing command and at the same time, the drive distance of the moving object is read out by the drive-distance sensor 25 (step S2). The drive-distance data "L" read out in this manner is stored into a predetermined address in the RAM 126. In the GPS positioning calculator 23, the GPS positioning process is repeated at a predetermined time interval after the initialization. The resultant GPS positioning data is input to the microprocessor 100. The positioning data includes the drive distance of the moving object obtained from the drive-distance sensor 25 and status information to indicate whether the GPS positioning can be performed or not.

In the next step S3, a check is made whether the resultant status information is valid or not. That is, when it is determined that the GPS positioning can be performed (YES) under the present condition, the control is advanced to a step S4. To the contrary, when it is decided that the GPS positioning cannot be executed (NO), the system is set to the standby mode until the answer in discriminating step S3 becomes YES. In step S4, the present position by the self-contained type navigator of the moving object is detected on the basis of the data from the azimuth sensor 24 and drive-distance sensor 25. The results of the detection are transferred to the microprocessor 100 and stored into another designated addresses in the RAM 126. It is now assumed that a moving object is traveling in an approximately flat surface district. The east-west direction of this district is indicated by an X axis and the south-north direction perpendicular thereto is represented by a Y axis. In this case, an arbitrary position in this district can be represented by a point on the orthogonal coordinates system by the X and Y axes. Namely, it can be two-dimensionally represented. Assuming that the present position information of the self-contained type navigator of the moving object specified in this manner is expressed by values $(X_s, Y_s)$. These values $(X_s, Y_s)$ are stored into the RAM 126 in step S4. In step S4, the present position information (which is represented by the corresponding latitude and longitude) based on the GPS positioning from the GPS positioning calculator 23 is converted into the corresponding present-position information $(X_0, Y_0)$ on the orthogonal coordinates system and the values $(X_s, Y_s)$ of the present-position information of the self-contained type navigator of the moving object based on the various kinds of sensors which are stored in the RAM 126 are initialized into the values $(X_0, Y_0)$ of the present-position information of the moving object based on the GPS positioning.

In the next step S5, the values (X, Y) of the present-position information of the moving object which have already been stored in the RAM 126 are converted into the values $(X_0, X_0)$ of the present-position information acquired based on the GPS positioning in step S4. In step S6, the map data of the district including the present position of the moving object is read out of the map data memory 31 by the microprocessor 100. In the display controller 29, the map of this district is display-processed on the basis of the map data. The map which was display-processed is displayed by the display unit 30. In step S7, the present position of the moving object is cursor displayed at the corresponding position on the map displayed on the display unit 30 under the control of the display controller 29. In step S8, the control process is set to the standby mode until the GPS positioning data is input from the GPS positioning calculator 23. When the GPS positioning data is input from the calculator 23, the control process is advanced to the next step S9 where a check is made whether or not the GPS positioning can be performed by checking the content of the status information included in the GPS positioning data. If the answer is YES, step S10 follows and the present position of the moving object is corrected on the basis of various kinds of self-contained type navigation information of the self-contained type navigator acquired from the sensors 24 and 25. Namely, in step S10, the values $(X_s, Y_s)$ of the present-position information of the moving object detected on the basis of various kinds of self-contained type navigator information obtained from the sensors 24 and 25 are corrected to the values $(X_{gps}, Y_{gps})$ on the orthogonal coordinates system formed with respect to the district where the moving object is present, as the present position information of the moving object based on the GPS positioning from the GPS positioning calculator 23. In other words, this correction corresponds to the correcting function of the correcting unit 28 in FIG. 2. In the succeeding step S11, the present position (X, Y) of the moving object stored in the RAM 126 is set to the present position $(X_{gps}, Y_{gps})$ based on the GPS positioning. In step S15, with regard to the present position of the moving object obtained in step S11, a check is made to see if the map to be displayed needs to be updated or not.

On the other hand, if the answer is NO in discriminating step S9 (i.e., no GPS navigation data is available), step S12 follows in which the detection data is read out by the azimuth sensor 24 and drive-distance sensor 25. That is, a moving azimuth $\theta$ of the moving object is read out by the azimuth sensor 24. In addition, a drive-distance $L_0$ of the moving object is read out by the drive-distance sensor 25. A drive-distance $\Delta L$ of the moving object within a predetermined time period is obtained by executing an arithmetic operating equation $(\Delta L = L_0 - L)$. Then, the drive-distance $L_0$ is stored into the RAM 126 as a reference drive distance L at that time constant. In step S13, with respect to the self-contained type present position $(X_s, Y_s)$ of the moving object detected by those sensors, the adding operations are executed by using the X and Y axes components of the drive-distance $\Delta L$. Namely, $$\begin{cases} X_s + \Delta L \cdot \cos\theta \rightarrow \text{updated } X_s \\ Y_s + \Delta L \cdot \sin\theta \rightarrow \text{updated } Y_s \end{cases}$$

In this manner, the self-contained type present position $X_s, Y_s)$ of the moving object detected by the sensors is updated. In step S14, the self-contained type present position $(X_s, Y_s)$ of the moving object detected by the sensors is set to the present position (X, Y) of the moving object. Then, step S15 follows where a check is made whether the map needs to be updated or not. If the answer is YES in step S15, the control process is advanced to step S16 in which the updated map is displayed. Thereafter, the accurate present position of the moving object is displayed with superimposed on the updated map (step S17). Conversely, if the answer is NO in step S15, the control process is soon advanced to step S17 and the present position of the moving object is displayed on the map which is not updated.

As described above, in the GPS navigation system according to the preferred embodiment, even if the GPS positioning cannot be performed because the number of satellites whose GPS navigation waves can be received among a plurality of satellites constituting the GPS, becomes two or less, or even if the GPS positioning accuracy is not so high, the present-position of the moving object can be accurately detected on the basis of the self-contained type present-position information acquired from the azimuth sensor and drive-distance sensor. Therefore, there is a particular advantage such that an operator of the moving object can always confirm its correct present position and can rapidly accurately arrive at an object position.

GPS/Self-Contained Combination Type Navigator Operable in Second Mode

Figure 5:
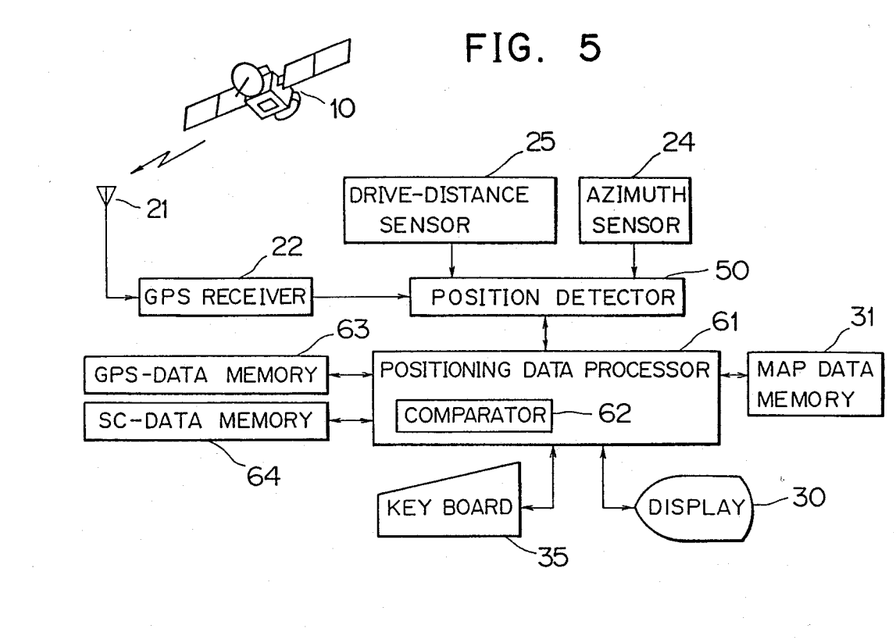
FIG. 5 schematically illustrates a block diagram of a GPS/self-contained combination type navigation system according to a second preferred embodiment of the invention.
Figure 6:
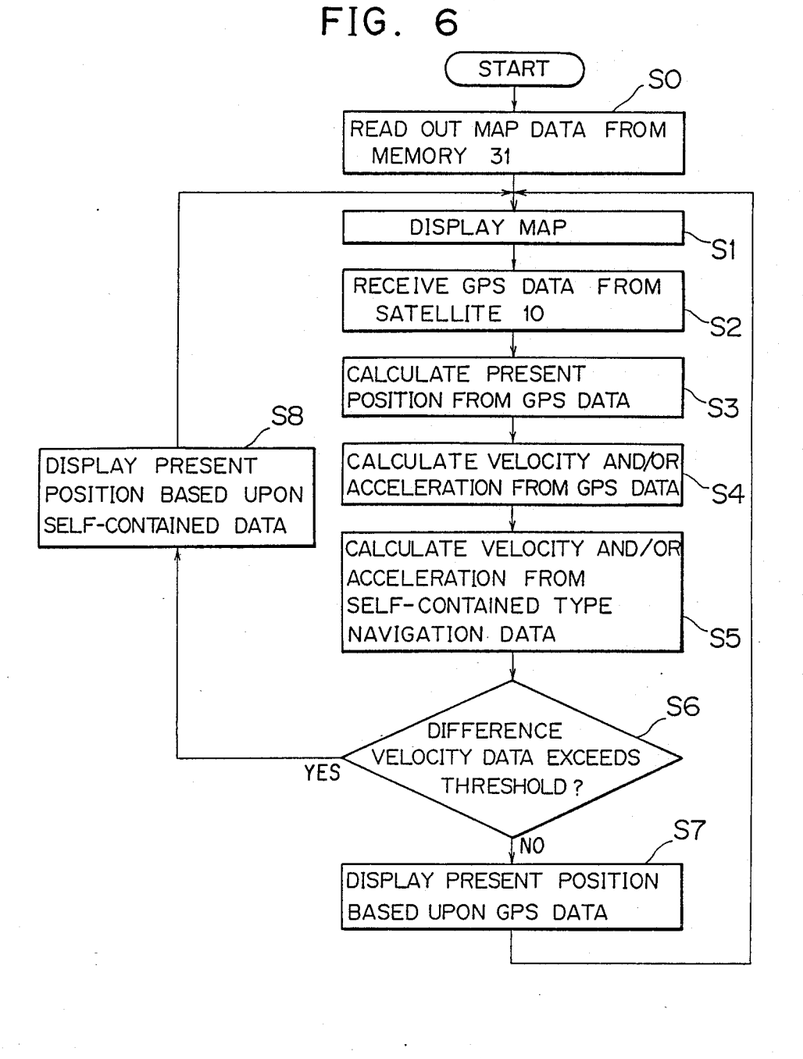
FIG. 6 is a flowchart for explaining the navigation by the navigation system shown in FIG. 5.

A vehicle-mount type navigator apparatus according to a second preferred embodiment is shown in FIGS. 5 and 6.

FIG. 5 is a conceptional diagram of the navigator apparatus. FIG. 6 is a flowchart for the operation of this navigator apparatus.

In FIGS. 5 and 6, the same and similar components and elements as those in the first embodiment are designated by the same reference numerals, and therefore their descriptions are omitted.

Figure 7:
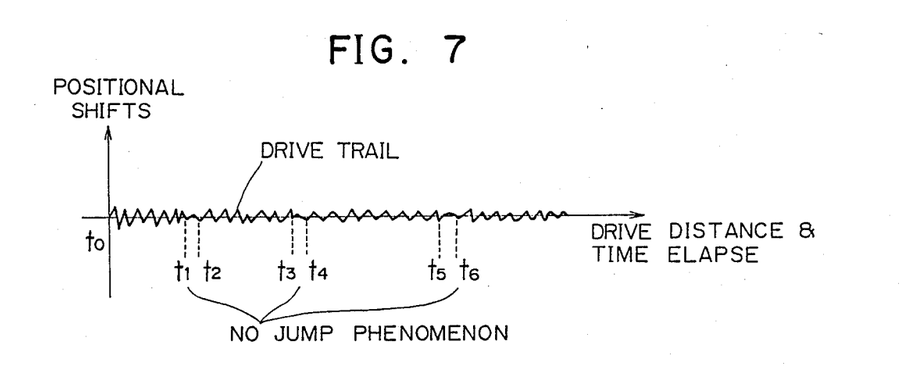
FIG. 7 is a graphical representation on the positional shifts of the vehicle with respect to the drive distance according to the GPS/self-contained type navigation system illustrated in FIG. 5.

In FIG. 5, the GPS navigation waves transmitted from the satellite 10 are received by the antenna 21. An output terminal of the antenna 21 is connected to the GPS receiver 22. The drive-distance sensor 25 and the azimuth sensor 24 are similarly connected to an output terminal of the GPS receiver 22 and a position detector 50. An output terminal of the position detector 50 is connected to a positioning data processor 61. The map data memory 31 and display unit 30 are connected to the positioning data processor 61. Furthermore, the positioning data processor 61 includes a comparator 62 having a data comparison function, which will be explained hereinlater. Further, a GPS-data memory 63 and a self-contained type data memory (hereinafter, abbreviated to an SC-data memory) 64 are connected to the positioning data processor 61. FIG. 6 is a flowchart for explaining the operation in this embodiment. FIG. 7 is an operation characteristic diagram of this second preferred embodiment.

The navigation operation of the second preferred embodiment shown in FIG. 5 will now be described with reference to FIGS. 6 and 7. An operator of a moving object such as a vehicle or the like depresses a start key (not shown in detail) on a keyboard 35, thereby activating the vehicle-mount type navigator apparatus according to the second preferred embodiment. Referring now to FIG. 6, it is assumed that the present position of the moving object is approximately known, and the map data relating to the present position is read out from the map data memory 31 (step S0) and displayed on the display unit 30 through the positioning data processor 61 (step S1). The GPS navigation waves from the satellite 10 are received as the GPS data by the antenna 21 (step S2) and are subjected to the foregoing predetermined processes by the position detector 50 and positioning data processor 61, so that the present position of the moving object is calculated based on the GPS navigation data (step S3). Then, the moving velocity and/or acceleration are calculated (step S4). Next, the moving velocity and/or acceleration of the moving object are independently calculated by the self-contained type navigator function on the basis of desired self-contained type navigation data read out from the drive-distance sensor 25 and azimuth sensor 24 (step S5). The GPS navigation velocity and/or acceleration data acquired in step S4 is temporarily stored into the GPS-data memory 63. The self-contained type navigation (i.e., velocity and/or acceleration) data in step S5 is temporarily stored in the SC-data memory 64. The difference between the GPS navigation data acquired at a time instant and the self-contained type navigation data which was obtained at the same time instant or immediately before that time instant is calculated. A check is made by the comparator 62 whether or not the comparison result falls within a range of a predetermined limit value (step S6). This comparison will be explained in detail hereinlater. If the answer is YES in step S6, the present position of the moving object is displayed on the basis of the GPS navigation data only as the satellite data (step S7) and the processing routine is returned to step S1. If the answer is NO in step S6, the present position of the moving object is displayed based on the self-contained type navigation data (step S8) and the processing routine is returned to step S1.

Reference will now be made to the characteristic diagram of FIG. 7. The abscissa in this diagram indicates the drive-distance of the moving object and the elapsed time. A zigzag solid line shown along the abscissa denotes the drive trail of the moving object. The ordinate represents the positional shifts from the present position (true present position) of the moving object. In time intervals $t_1$ to $t_2$, $t_3$ to $t_4$, and $t_5$ to $t_6$ on the abscissa, since the answer is "NO" in discriminating step S6 in FIG. 6, the navigation data based on the GPS navigator function is ignored (in other words, it is not used) and the navigation data based on only the self-contained type navigator function is utilized. The present position of the moving object by this navigation data is displayed. Therefore, the occurrence of the jump phenomenon in the conventional GPS navigator is certainly eliminated. The occurrence of a serious traffic accident as the result of the misconfirmation of the present position of the vehicle is also prevented.

Practical GPS/Self-Contained Combination Type Navigation System

Before proceeding with a practical circuit diagram of the GPS/self-contained combination type navigation system according to the second embodiment mentioned above, the outline of the navigation system of the invention will be simply explained.

In general, to navigate a moving object such as a vehicle along a predetermined route, it is necessary to sequentially recognize the present position at a predetermined time interval. According to the typical GPS positioning system, the arithmetic operation to display the present position of the vehicle is always performed by using the GPS navigation waves transmitted from the satellites. The reception sampling period of this GPS signal is selected to, e.g., 0.5 second. Therefore, the present-position information of the moving object is collected every 0.5 second. Thus, excluding the specific case, there is an advantage such that the accurate present-position information is always obtained at the high positioning accuracy based upon only the GPS navigation waves. In general, the drive-distance resolution is set to 100 m. The optimum drive-distance resolution of 30 m can be realized.

On the other hand, in the typical self-contained type navigator, the present position of the moving object is measured by using the azimuth sensor and drive-distance sensor. Therefore, the positional shifts between the actual position and the position displayed on the map do not have abnormal values. In other words, the present-position displayed on the map is not extremely different from the true present position. However, there is a drawback such that as the drive-distance increases, the positional shifts are accumulated.

According to the present invention, the following combination type navigation system is used in consideration of the features which are specific to the GPS type navigator and self-contained type navigator. Namely, the GPS type navigator is preferentially functioned in order to make the most of the prompt accurate drive-distance resolution of the GPS type navigator. However, as mentioned above, in the specific case where the GPS navigation waves from the satellites cannot be received or a predetermined positioning accuracy cannot be obtained as mentioned above, the GPS (navigation) positioning data obtained from the GPS type navigator is not used but the positioning data acquired from the self-contained type navigator is used.

In such a specific case, for example, when the velocity of an automobile is measured at the sampling interval of 0.5 second, if the automobile runs at the velocity of 60 km/h, the reasonable GPS navigation data becomes approximately 8.3 m/0.5 sec. However, assuming that this measurement data is obtained at the position which is 100 m away from the preceding measurement position, in this case, the GPS navigation data becomes 100 m/0.5 sec=720 km/h. Such a high velocity is the abnormal speed for the automobile. In such a specific case, this abnormal GPS navigation data is ignored (not used). In place of this abnormal GPS data, the self-contained type navigation data is used. Thereafter, if the normal GPS data is obtained, the operating mode is automatically soon switched to the GPS navigation mode and the navigation is continuously executed As a basis to determine whether the GPS positioning data obtained is normal or abnormal, various kinds of discrimination bases can be considered. In the following embodiment, the velocity (or acceleration) is used as this discrimination basis.

Figure 8:
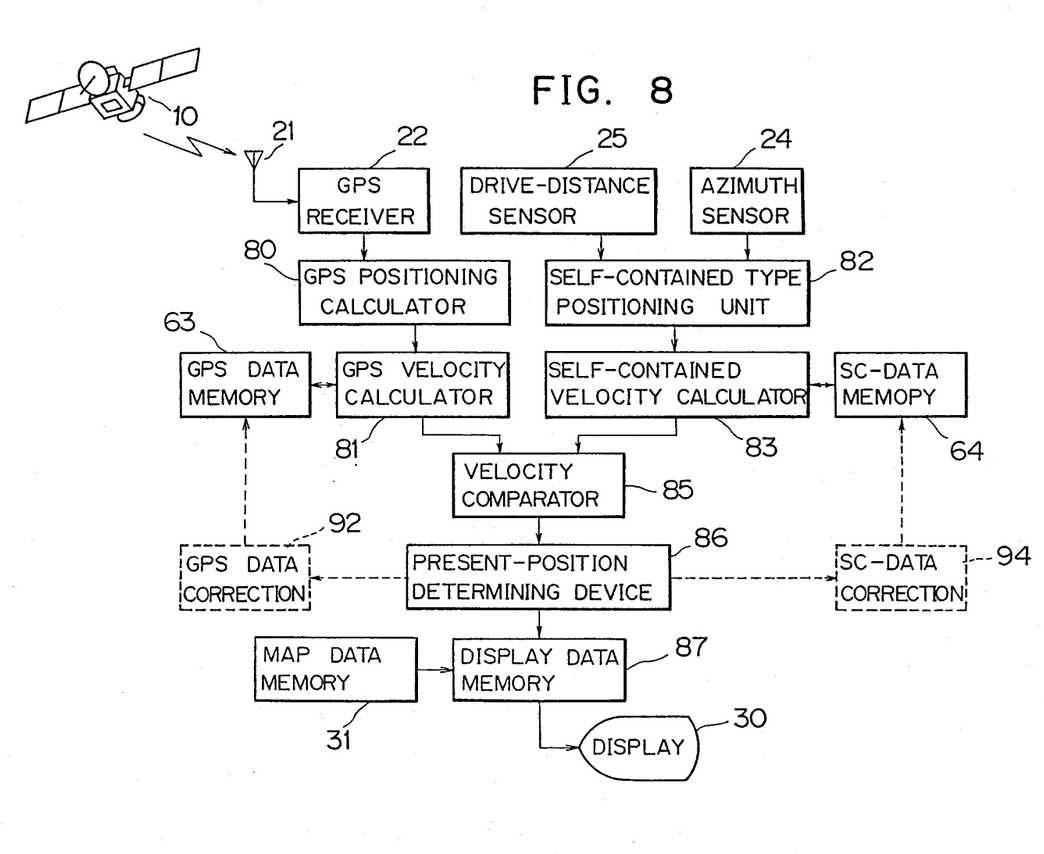
FIG. 8 is a circuit block diagram of the practical GPS/self-contained type navigation system according to the second preferred embodiment.

FIG. 8 is a functional block diagram of a navigation system relative to the navigation system of FIG. 5.

In FIG. 8, the same and similar components and elements as those shown in FIG. 5 are designated by the same reference numerals and their descriptions are omitted.

In FIG. 8, the GPS navigation waves transmitted from the satellite 10 are received by the GPS receiver 22 through the GPS antenna 21 and subjected to the predetermined signal processes. The GPS reception signal is supplied to a GPS positioning calculator 80. A predetermined GPS positioning calculation is performed by the calculator 80. An output of the calculator 80 is supplied to a GPS velocity calculator 81 to calculate the present velocity of the vehicle (moving object). Obviously, the acceleration is obtained by differentiating the velocity by time and the acceleration can be also used as a discrimination basis as will be explained hereinafter. The present velocity based on the GPS positioning data obtained by the foregoing calculation is temporarily stored into the GPS positioning data memory 63.

On the other hand, the sensor outputs from the azimuth sensor 24 and drive-distance sensor 25 are supplied to a self-contained type positioning unit 82 to obtain a positioning signal. The positioning signal is further supplied to a self-contained type velocity calculator 83, thereby calculating the present velocity based on the self-contained type navigation data. This present velocity data is temporarily stored into the self-contained type positioning data memory 64.

Next, the GPS velocity data and self-contained type present velocity data are read out of the memories 63 and 64 at a predetermined timing in consideration of the sampling interval of the GPS navigation and supplied to a velocity comparator 85 and compared in the following manner.

A velocity corresponding to the difference between the GPS present velocity and the self-contained velocity is obtained. Next, a check is made to see if the velocity difference exceeds a predetermined threshold value or not.

The comparison result is supplied to a present position determining device 86 at the post stage. If abnormal velocity data is included in the velocity data caused by the GPS navigation data as mentioned above, this abnormal velocity data is not used. The present velocity data obtained by the calculation on the basis of the self-contained type navigation data is used as the present position information.

If the velocity difference data falls within the threshold value, the navigation system in this embodiment preferentially uses the GPS navigation data only and displays the present position and the drive control is executed by the GPS navigation system.

The present position data determined by the present position determining device 86 is temporarily stored into a display data memory 87. Desired map data is read out of the map data memory 31. These data are multiplexed and the present position of the vehicle is displayed with superimposed on related map by the display unit 30.

As shown by broken lines in FIG. 8, it is also possible to constitute in a manner such that the present position data from the present position determining device 86 is respectively supplied to a GPS position correcting device 92 and a self-contained type position correcting device 94, the position correction is performed similarly to the first embodiment, and the corrected data is stored into the corresponding GPS data memory 63 and self-contained data memory 64.

The following modifications of the foregoing embodiment are also considered. Namely, in the second embodiment of FIG. 7, the present velocity or acceleration data is sequentially calculated from the GPS navigation data and compared with the self-contained type present velocity or acceleration data, thereby performing a desired positioning. In place of this method, the past velocity or acceleration is calculated from the past positioning data acquired by the GPS system and thereafter compared with the present velocity or acceleration from the GPS data obtained at present. As a result, it is also possible to determine whether the present velocity or acceleration is normal or abnormal based upon the comparison result.

Furthermore, by setting the sampling interval of the GPS data to be long, the intermediate velocity data for this long interval can be also calculated by use of what is called "an interpolation method".

As has been described in detail, the vehicle-mount type navigator apparatus according to the second embodiment is characterized by comprising: a receiving unit for receiving a GPS signal as GPS navigation waves from a GPS satellite; a self-contained type signal receiving unit such as drive-distance sensor to detect a drive-distance of a vehicle and an azimuth sensor to detect an azimuth of the vehicle; a display unit to display a present position of the vehicle and a map relative to the present position so as to overlap them; a map data memory to store predetermined map data; and a data processor for processing various kinds of signals and data, and selectively outputting corresponding GPS data or self-contained type data, wherein the data processor includes a comparator to compare the GPS positioning data obtained at a certain time instant and the self-contained type positioning data obtained at the corresponding time instant, and the GPS data memory and self-contained type data memory are connected to the data processor.

In such a navigation system, in general, the GPS navigator function is preferentially selected. The GPS positioning (e.g., velocity) data at a certain time instant is compared with the self-contained type positioning data obtained at this time instant or immediately before that time instant. When the difference between these velocity data exceeds a predetermined velocity basis, the GPS velocity data obtained at the certain time instant is ignored. Thus, the occurrence of the jump phenomenon is certainly eliminated. Therefore, there is a particular advantage such that the occurrence of a serious traffic accident as the result of the misconfirmation of the present position due to the jump phenomenon is also prevented.

What is claimed is:

1. A global positioning system (GPS)/self-contained combination type navigation system for a moving object comprising:
   self-contained type positioning means for acquiring self-contained type positioning information of the moving object;
   GPS type positioning means for acquiring GPS type positioning information from GPS navigation data transmitted from a plurality of satellites arranged for constituting the global positioning navigation system;
   correcting means for producing a correction signal to be supplied to the self-contained type positioning means based upon the GPS type positioning information, whereby corrected self-contained type positioning information is derived from the self-contained type positioning means;
   present-position determining means for determining a present position of the moving object by processing one of said corrected self-contained type positioning information and GPS type positioning information, depending upon a reception condition of said GPS positioning information;
   map data memory means for previously storing map data required for navigating the moving object; and
   display means for displaying the present position of the moving object superimposed on the map data by receiving the output of the present-position determining means and the map data from the map data memory means.

2. A GPS/self-contained combination type navigation system as claimed in claim 1, wherein said GPS type positioning means includes:
   an antenna for receiving the navigation data transmitted from said plurality of satellites, and for outputting a GPS satellite signal;
   a GPS receiver for processing the GPS satellite signal derived from the antenna to obtain a GPS navigation signal; and
   a GPS positioning calculator for calculating the GPS navigation signal so as to obtain the GPS positioning information.

3. A GPS/self-contained combination type navigation system as claimed in claim 1, wherein said self-contained type positioning means includes:
   an azimuth sensor for sensing an azimuth of the moving object;
   a drive-distance sensor for sensing a drive distance of the moving target; and
   a self-contained type positioning unit for processing an azimuth sensor output and a drive-distance sensor output so as to obtain the self-contained type positioning information.

4. A GPS/self-contained combination type navigation system as claimed in claim 1, wherein said present-position determining means determines the present position of the moving object by processing said GPS type positioning information, when receiving the GPS navigation data simultaneously transmitted from more than 3 pieces of the satellites inclusive.

5. A GPS/self-contained combination type navigation system as claimed in claim 1, wherein a microprocessor is employed so as to acquire the self-contained type positioning information of the moving object, to produce the correction signal based upon the GPS type positioning information, and to determine the present position of the moving vehicle by processing one of said GPS and said corrected self-contained type positioning information, depending upon the reception condition of the GPS positioning information.

6. A GPS/self-contained combination type navigation system as claimed in claim 5, further comprising an operation key board for producing an initializing signal so as to initialize the microprocessor.

7. A global positioning system (GPS)/self-contained combination type navigation system for a moving object comprising:
   self-contained type positioning means for acquiring self-contained positioning information of the moving object;
   GPS type positioning means for acquiring GPS type positioning information from GPS navigation data transmitted from a plurality of satellites arranged for constituting the global positioning navigation system;
   correcting means for producing a correction signal to be supplied to the self-contained type positioning means based upon the GPS type positioning information, whereby corrected self-contained type positioning information is derived from the self-contained type positioning means;
   present-position determining means for determining a present position of the moving object by processing only one of said corrected self-contained type positioning information and GPS type positioning information, depending upon a reception condition of said GPS positioning information;
   wherein said present-position determining means determines the present position of the moving object by processing said self-contained type positioning information and by replacing said self-contained type positioning information by said GPS type positioning information only when receiving the GPS navigation data simultaneously transmitted from at least three satellites.

8. The GPS/self-contained combination type navigation system for a vehicle as claimed in claim 7, further comprising means for processing said GPS type positioning information and said self-contained type positioning information for obtaining therefrom GPS type velocity data and self-contained type velocity data, respectively;
   comparing means for comparing said GPS type velocity-data with said self-contained type velocity data to obtain velocity comparison data; and
   wherein said present-position determining means is operable for processing one of said GPS type velocity data and said self-contained type velocity data to determine a present position of the vehicle by judging whether or not the velocity comparison data exceeds a threshold velocity.

9. A GPS/self-contained combination type navigation system for a vehicle as claimed in claim 8 wherein said means for processing further processes both GPS type velocity data and self-contained type velocity data so as to obtain GPS type acceleration data and self-contained type acceleration data, respectively;
   said comparing means further comparing said GPS type acceleration data with said self-contained type acceleration data thereby to obtain acceleration comparison data;

said present-position determining means further processing one of said GPS type acceleration data and GPS type acceleration data so as to determine the present position of the vehicle by judging whether or not the acceleration comparison data exceeds threshold acceleration.

10. A GPS/self-contained combination type navigation system for a vehicle as claimed in claim 8, whereas said present-position determining means includes means for ignoring that the GPS type velocity data when it is determined that the velocity comparison data exceeds the threshold velocity.

11. A global positioning system (GPS/self-contained combination type navigation system for a vehicle comprising:
- GPS type positioning means for acquiring GPS type positioning information from GPS navigation data transmitted from a plurality of satellites arranged for constituting the global positioning navigation system;
- self-contained type positioning means for acquiring self-contained type positioning information of the vehicle;
- positioning-data processing means for processing both the GPS type positioning information from the GPS type positioning means and the self-contained type positioning information from the self-contained type positioning means so as to obtain GPS type velocity data and self-contained type velocity data, respectively;
- first memory means for temporarily storing the GPS type velocity data derived from the positioning-data processing means;
- second memory means for temporarily storing the self-contained type velocity data derived from the positioning-data processing means;
- comparing means for comparing said GPS type velocity-data read out from the first memory means with said self-contained type velocity-data read out from the second memory means thereby to obtain velocity comparison data;
- present-position determining means for processing one of said GPS type velocity data and self-contained type velocity data so as to determine a present position of the vehicle by judging whether or not the velocity comparison data exceeds a threshold velocity;
- map data memory means for previously storing map data required for navigating the vehicle; and,
- display means for displaying the present position of the vehicle superimposed on the map data by receiving the output of the present-position determining means and the map data from the map data memory means, wherein said positioning-data processing means further processes both GPS type velocity data and self-contained type velocity data so as to obtain GPS type acceleration data and self-contained type acceleration data, respectively;
said comparing means further comparing said GPS type acceleration data with said self-contained type acceleration data thereby to obtain acceleration comparison data;
said present-position determining means further processing one of said GPS type acceleration data and GPS type acceleration data so as to determine the present position of the vehicle by judging whether or not the acceleration comparison data exceeds threshold acceleration.

12. A GPS/self-contained combination type navigation system for a vehicle as claimed in claim 11, wherein said self-contained type positioning information is simultaneously acquired when said GPS type positioning information is acquired by the GPS type positioning means.

13. A GPS/self-contained combination type navigation system for a vehicle as claimed in claim 11, wherein said self-contained type positioning information is acquired just before the corresponding GPS type positioning information has been acquired by the GPS type positioning means.

14. A GPS/self-contained combination type navigation system for a vehicle as claimed in claim 11, wherein said GPS type positioning means includes:
- an antenna for receiving the GPS navigation data transmitted from said plurality of satellites, and for outputting a GPS satellite signal;
- a GPS receiver for processing the GPS satellite signal derived from the antenna to obtain a GPS navigation signal; and
- a GPS positioning calculator for calculating the GPS navigation signal so as to obtain the GPS positioning information.

15. A GPS/self-contained combination type navigation system as claimed in claim 11, wherein said self-contained type positioning means includes:
- an azimuth sensor for sensing an azimuth of the vehicle;
- a drive-distance sensor for sensing a drive distance of the vehicle; and
- a self-contained type positioning unit for processing an azimuth sensor output and a drive-distance sensor output so as to obtain the self-contained type positioning information.

16. A GPS/self-contained combination type navigation system as claimed in claim 11, wherein said present-position determining means determines the present position of the vehicle by processing said GPS type velocity data, when receiving the GPS navigation data simultaneously transmitted from more than 3 pieces of the satellites inclusive.

* * * * *